Aug. 2, 1949.   E. R. ZADEMACH ET AL   2,478,034
GRIPPER CONVEYER FOR SUSPENDING SHEETS

Filed May 16, 1945   6 Sheets-Sheet 5

INVENTOR.
Erich R. Zademach and
William W. Clarke

BY Moser, Nolte, Crews + Berry
ATTORNEYS

Patented Aug. 2, 1949

2,478,034

UNITED STATES PATENT OFFICE

2,478,034

GRIPPER CONVEYER FOR SUSPENDING SHEETS

Erich R. Zademach, Hillside, and William W. Clarke, Summit, N. J., assignors to Metalwash Machinery Company, Irvington, N. J., a copartnership Application May 16, 1945, Serial No. 593,998

12 Claims. (Cl. 198—180)

This invention relates to machines of the type adapted for loading, conveying and unloading work material to be subjected to processing operations and more particularly to apparatus for pickling or etching aluminum or its alloys.

It is common practice in machines for conveying work through processing operations, to arrange a work track in the form of a closed circuit in the shape of a somewhat flattened O. When relatively thin pieces of work, such as sheets, bars, rods, or other shapes of material are conveyed transversely to the thickness dimension along such a track, the work assumes a different relation to the position of the track in passing around the curve from that occurring along the straight part of the path, as will be seen from the fact that a straight sheet may lie parallel with a straight portion of the track along which it is being conveyed, whereas the sheet will assume the position of a chord or tangent to the arc of a curved portion of the track along which it is being carried.

Various difficulties, such as buckling and marring of the work, excessive friction, the necessity of more complicated construction to support the work, etc., tend to result from the change of relation between the work and the track in the straight and curved portions of the path when the work is supported at each end from different points along the track.

It is an object of the present invention to counteract these difficulties and to provide simple and effective apparatus for conveying the work along the path of a track having straight and curved portions.

Another object is to provide improved apparatus of simple and convenient form for gripping the work and for loading and unloading the work carried by the conveying apparatus.

In accordance with one aspect of the present invention, work processing apparatus such as an aluminum etching machine for example, employs a work carrying track having straight and laterally curved portions therein, work supporting carriages being distributed in succession along the track with a flexible coupling element connecting the carriages together to serve as a continuous drive therefor. A separate link is provided to couple together the two carriages in each successive pair of carriages, work gripping tongs being supported by a unit swivelled to each link on a vertical axis. Part of each carriage between the flexible coupling element and the link is swingable parallel to the direction of travel of the carriage to permit of a corresponding displacement of the link and the tongs supported thereby, so that when a work piece is supported by two separate tongs spaced apart from each other along the track, the position of the work and the movement of the carriages may be suitably accommodated to any change of direction of the track without objectionable distortion or marring of the work, or related difficulties.

According to another aspect of the invention, work carrying tongs are provided with a pair of hinged-together, horizontally-openable, work-gripping jaws, an arm connecting with one of the jaws being operated by either of two sets of vertically responsive cam elements, one set for closing and locking, and the other set for opening the jaws. One of the two cam elements in each set is a cam, preferably having a substantially straight slope, the other being a cam follower, the jaw closing set of cam elements being operated by a downward pull of the tongs on their supporting unit, and the jaw opening set of cam elements being operated by an upward push of the tongs against the supporting unit, the tongs having thereon one cam element of each set and the supporting unit having thereon the other element of each set. The jaws are thus quickly and conveniently openable or closable automatically by a simple vertical movement of the tongs relative to their support.

At an unloading and loading station for the tongs, a lifter adjacent to the path of the tongs may be operated to automatically open the jaws of all the tongs engaging therewith, thereby causing them to release or drop their load as they travel continuously through the station.

A guide shoe fast to each tongs supporting unit, between the swivel of the unit and the tongs, provides means for turning the tongs supporting part of each unit on its vertical axis into predetermined alignment with the track at a station on the track, to orient each unit so that the tongs supported thereby are openable to receive work parallel with the track. A guide rail adjacent to the path of the guide shoe in the station, turns the shoe of each unloaded or idle unit in its proper alignment with the track before loading. The rail also serves to maintain proper loading alignment of the tongs while unloaded as they ride along apparatus arranged to trip and unload the tongs, the tongs being finally released so that they may turn freely after passing out of the station.

When a work piece is of such length as to extend along the track as much as twice the distance between adjacent tongs, the tongs intervening between the two tongs used as work supports, or any tongs between one used as a work support and the adjacent end of the work, may be quickly and conveniently removed from the system by disconnecting the load supporting part of the supporting unit or units for such intervening tongs at a quickly detachable, self-aligning connection, such as a bayonet joint, provided in each unit for that purpose, thereby preventing unused tongs from objectionably interfering with the free movement of the work transversely to the track at points on the work remote from its two supports while the work travels over a path of changing curvature. By locating the quickly detachable joint connection at a point on the tongs supporting unit between the guide shoe and the tongs, the shoe may be employed to hold the swiveled part of the tongs supporting unit from turning on its vertical axis while removing or replacing the detachable part of the unit connecting directly with the tongs. Since the bayonet joint is self-aligning when the connection is completed, it always maintains the desired angular relation of the guide shoe to the tongs on the vertical axis of the swivel.

These and other objects and features of the invention will be understood more clearly from the following detailed description in connection with the accompanying drawings, in which.

Figure 1:
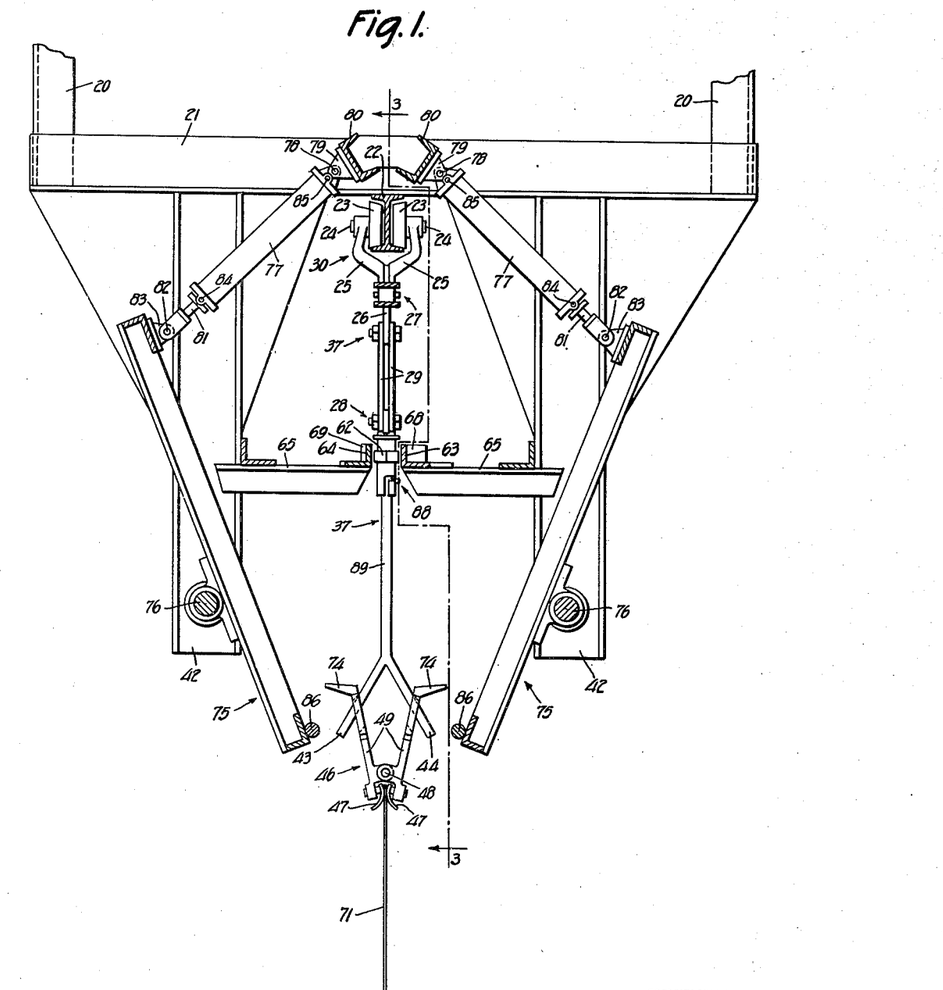
Fig. 1 is a sectional elevation taken on line 1—1 of Fig. 3, showing part of the improved machine transversely of the track at an unloading station and showing the work-carrying tongs before unloading.
Figure 3:
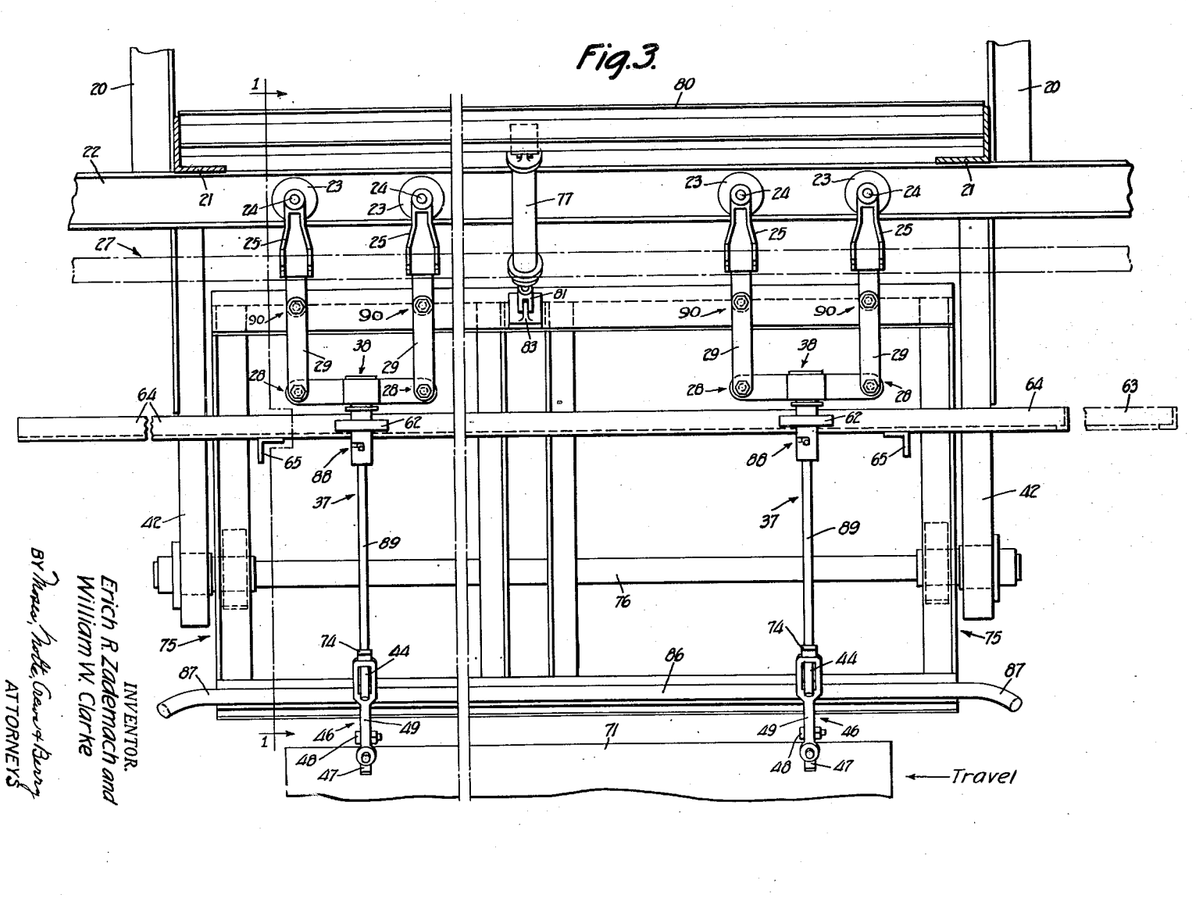
Fig. 3 is a sectional elevation of part of the machine at the unloading station, taken on the line 3—3 of Fig. 1.

Referring to Figs. 1 and 3, each of a plurality of pairs of columns 20, rigidly supported from a ceiling or other superstructure, not shown, support the girders 21. To the middle of the lower edge of each girder 21, is secured the I beam track 22, providing on each side thereof a support for one of the carriage wheels 23, Fig. 7, having shafts 24 journalled respectively in the hangers 25, the hangers being spaced apart at their lower end by the spacing bar 26. A plurality of carriages 30 are distributed in succession along the track, as in Fig. 5, and connected together by a flexible coupling, such as the drive chain 27, which connects the carriages together at points on the carriages, preferably relatively close to the track so that the track may freely guide the drive chain 27 as the chain is fed continuously by the sprocket gear 27a, Fig. 6, driven by the motor 27b.

Figure 7:
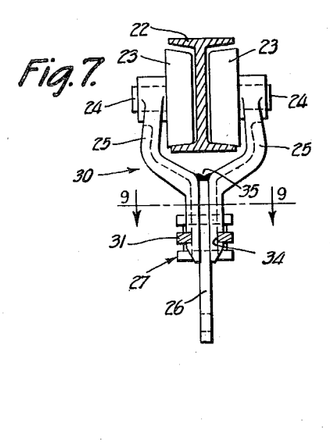
Fig. 7 is an elevation of a part of the work carrier, taken on the line 7—7 of Fig. 5.
Figures 8, 9:
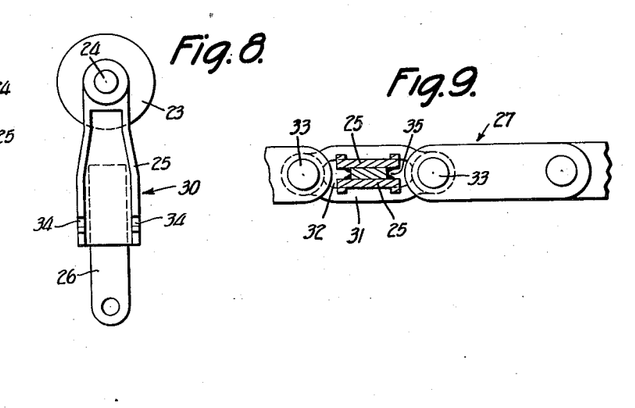
Fig. 8 is a side elevation of part of the work carrier of Fig. 7.
Fig. 9 is a sectional plan view of part of the carrier, taken on line 9—9 of Fig. 7.

The method of assembly of the carriage 30 with the chain drive 27 will be seen more clearly by reference to Figs. 7, 8 and 9. The solid link 31 is provided with a central aperture 32 between the pivots 33 of the link. Before the spacer 26 is sandwiched between hangers 25, the lower ends of the hangers are inserted through the aperture 32, so that the profile of each notch 34 nests with the corresponding profile of link 31 at the aperture 32. The spacer 26 is then inserted in its proper position between hangers 25, as shown in Fig. 7, and secured to the hangers, as by welding 35 or other suitable means.

Figure 4:
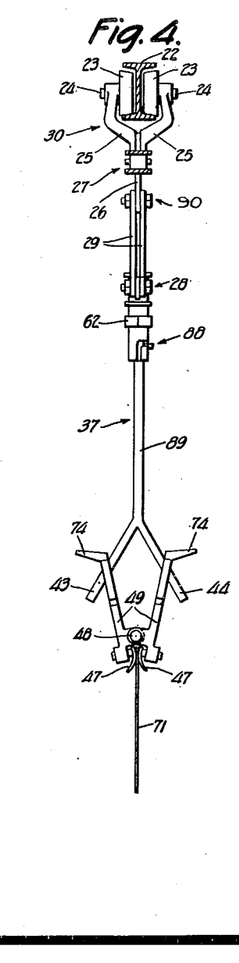
Figs. 4 and 5 are end and side elevations, respectively, of the work carrier.
Figure 5:
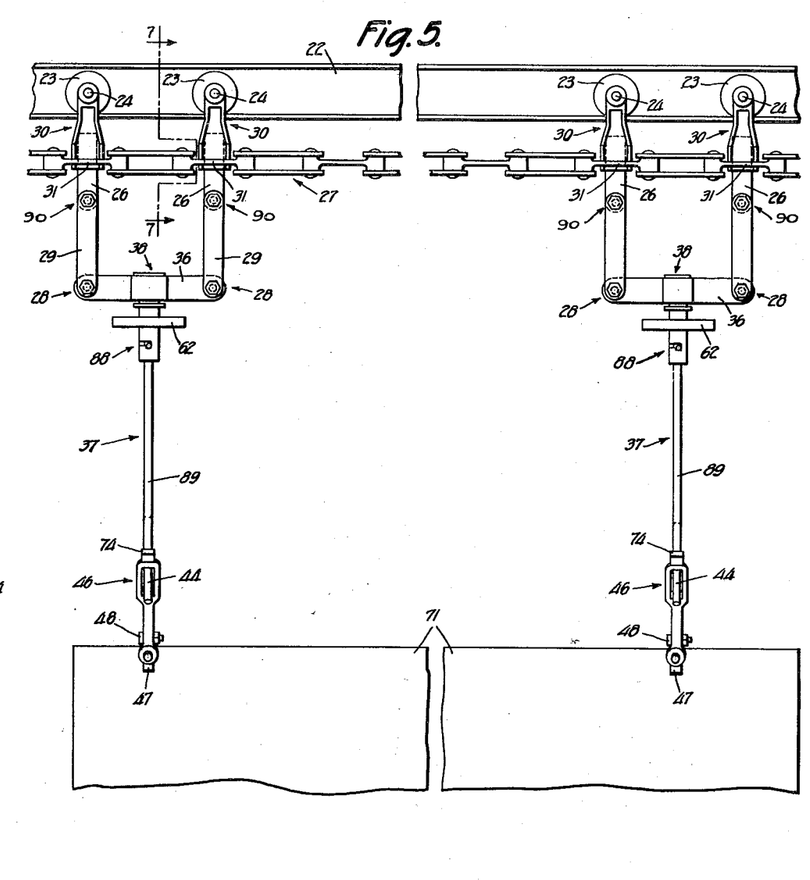

A substantially horizontal link 36, Fig. 5, connects together each pair of carriages 30, 30, by a hinge 28 at each end of the link and each carriage has a hinge 37 between the link 36 and the chain 27, thus providing a vertical link 29 for each carriage, each link being preferably made of two bars as shown in Fig. 4, although one bar may obviously be omitted. The hinges 28 and 37, and the carriage wheel shafts 24 in any given pair of carriages, have parallel axes at right angles to the track 22, so that the links 29 and 36 are swingable in a direction parallel with the general direction of travel of the carriages on the track. A tongs supporting unit 37, is suspended from the link 36 by the swivel 39, Figs. 10, 11, having a vertical axis of rotation and consisting of the shaft 39 journalled in the link 36, collars 40 and 41, being secured to the shaft 39 to limit axial displacement of the shaft relatively to link 36.

*Tongs construction*

Figures 10, 11, 12, 13, 14, 15, 16:
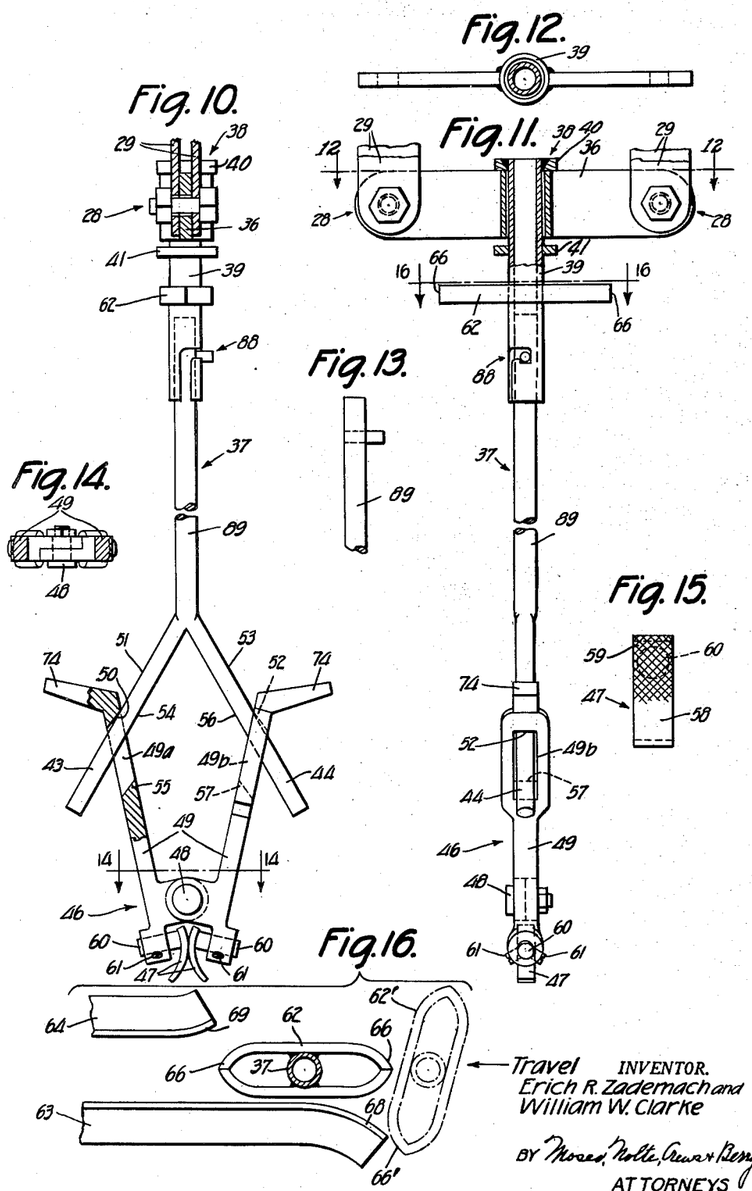
Fig. 10 is an elevation, partly in section, showing the swivel and bayonet supporting connections between the tongs and the upper part of the work carrier.
Fig. 11 is an elevation of the structure shown in Fig. 10, as viewed from the right side of Fig. 10.
Fig. 12 is a sectional plan view of a detail of the swivel support of Fig. 10, taken on line 12—12 of Fig. 11.
Fig. 13 is an elevation of the lower part of the bayonet connection of Fig. 10.
Fig. 14 is a sectional plan view of the tongs, taken on line 14—14 of Fig. 10.
Fig. 15 is an elevation of the work contacting face of a jaw of the tongs.
Fig. 16 is an enlarged sectional plan view of the tongs guiding means, taken on line 16—16 of Fig. 11.

The tongs supporting unit 37 is provided with two downwardly diverging legs 43, 44 at its lower end, forming an inverted V-structure upon which the tongs 46 are supported. The tongs 46 include a pair of downwardly flaring jaws 47 hinged together by the bolt 48 which serves as a pivot for the jaws 47 and the respective tong arms 49 connecting therewith. The free end of each arm 49 has an aperture 49a or 49b through which one of the legs 43, 44 is projected. It will be noted that the upper edge 50 of the aperture 49a, in one of the arms 49, Fig. 10, is supported directly upon the outer edge 51 of leg 43, while the corresponding aperture edge 52 of the other arm of the tongs rests upon the outer edge 53 of leg 44. Since the outer edges 51, 53 of the V have substantially straight slopes, the elements 50, 52 on the tong arms which are supported on these slopes, tend to slide down the slopes in response to the downward pull of the tongs 46 on their support 37. The slope 51 thus provides a cam which is followed by the element 50 as a cam follower, while the slope 53 serves as a cam and the element 52 as a follower. These two sets of cam elements thus serve to force the jaws 47 horizontally in a closing direction in response to a vertically downward pull of the tongs 46 on the support 47.

In order to load the tongs, a work piece such as a sheet of aluminum, for example, may be thrust upwardly into the gap between the flaring jaws 47, until the tongs 46 are raised vertically upward, thus lifting the cam elements 50, 52 above elements 51, 53 upon which they are normally supported, thereby removing the closing pressure on jaws 47, which are then free to open and are urged to an open position by virtue of the flaring jaws 47 being wedged open by the work piece. In case the jaws 47, for any reason offer resistance to opening, the tongs 46 may continue to move upward until the substantially straight inner edge 54 of the leg 43 serving as a cam engages with the cam follower element 55 at the lower edge of the aperture 49a through which the leg 44 projects. Similarly, the corresponding inner edge 56 of the leg 44, serving as a cam, engages the element 57 at the lower edge of the aperture 49b. The vertically upward movement of the tongs thus exerts a force tending to push the arms 49 together and force the jaws 47 horizontally in an opening directon to admit the work piece between them. As soon as the work starts slipping into the space between the jaws 47, the vertical upward force of the work on the tongs is relieved so that the tongs may drop downwardly, thereby disengaging the sets of cam elements 54, 55 and 56, 57, and thereby removing the jaw opening force. At the same time, cam elements 50, 51 and 52, 53 may now re-engage so that the downward pull of the tongs on the support 37, may urge the jaws 47 to a closed position to apply a strong gripping force on the work and effectively lock them against opening.

Each of the jaws 47 is preferably relatively smooth at the lower end 58 thereof as shown in Fig. 15, while the upper end 59 which engages in gripping contact with the work, is preferably provided with a roughened surface. By arranging the jaws 47 with arcuate profiles having the convex surfaces of the jaws face to face with each other, the work may be readily inserted or removed from between the jaws without objectionable injury to the surface of the work. In order to adjust the position of the jaws and to facilitate replacement, each jaw surface is backed up by a cylindrical stub 60, fitting closely within a hole at the jaw end of the tongs, and firmly secured in position by a pair of set screws 61. It will be seen that the straight sides of the apertures 49a, 49b, serve to maintain the tongs 46 in fixed angular position on a vertical axis with respect to the legs 43, 44 of the V of the tongs support 37. The tong jaws 47 are particularly adapted to receive a relatively thin work piece 71 such as sheet metal, for example, as shown in Figs. 1 to 5, the swivel 38 making it possible to turn the tongs 46 on their vertical axes to bring the openings of the jaws of a plurality of tongs into alignment with each other to receive the work sheet 71 parallel with the track 22. It will be understood that the jaws 47 are capable of accommodating work pieces of different thicknesses.

Tongs guide

A shoe 62, Fig. 16, fast to the tongs support unit 37, is provided to turn the unit 37 and the tongs 46 into proper alignment to receive the work sheet parallel with the track 22. In order to turn the shoes 62 into the desired predetermined alignment for this purpose, guide rails 63, 64 respectively, are provided adjacent to and parallel with the path of the shoe 62, one rail being on each side of the shoe path as shown in Figs. 1 and 16. The rails 63, 64 are secured to the brackets 65, secured to the columns 42, supported by girders 21. The shoe, 62 has oppositely directed, pointed ends 66, to aid in steering the shoe into the space between rails 63, 64, as the shoe travels from right to left in Fig. 16. Assuming the shoe to be in the position 62' as it approaches the rail 63, while traveling in the direction of the arrow, the end 66' will engage rail 63 and be rotated in a counterclockwise direction, until it points in the direction of travel of the shoe, the shoe being held parallel with the rail 63 and track 22 as it advances further toward the left and toward the rail 64 which still further aids in guiding the shoe. Rails 63, 64 also limit any tendency toward displacement of the tongs support unit 37 transversely to the rails 63, 64 and track 22. The rails 63, 64 are located in the loading and unloading station 67, Fig. 6, or at any other other suitable location on a straight portion of the track 22, represented by the single solid line in Fig. 6, where it is desired to guide the tongs parallel with the track 22. The advance ends 68, 69 of the rails 63, 64, respectively, are preferably deflected laterally away from the path of the shoe 62, as shown in Fig. 16, to aid in guiding the shoes 62 into the desired alignment parallel with track 22. The advance end 68 of rail 63 is positioned in advance of the advance end 69 of rail 64, to avoid the possibility of a shoe 62 being blocked in its path by striking both rail ends simultaneously. The advance ends 68, 69 of rails 63, 64 are preferably located close to the track entrance at the right end of the unloading section of station 67, Fig. 6, while the other ends of the rails preferably extend to the track exit at the left end of the loading section of the station.

Track curvature compensation

Figure 6:
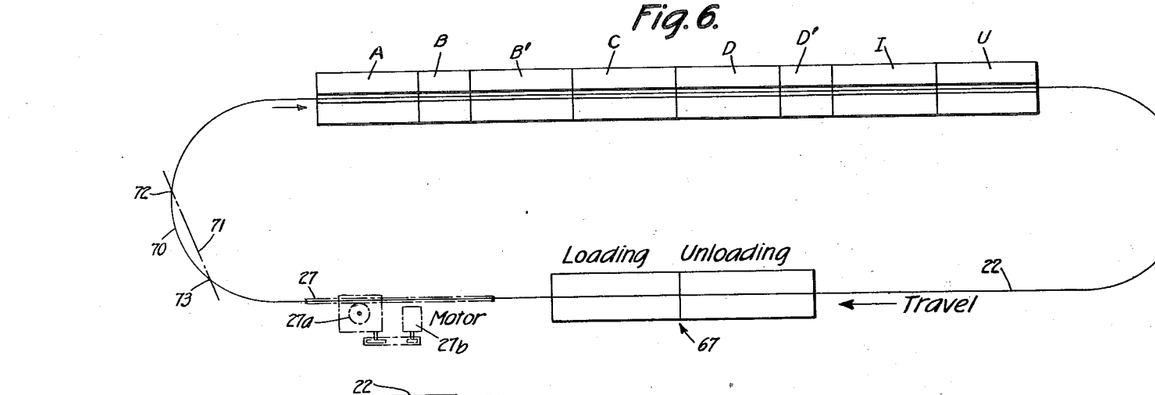
Fig. 6 is a schematic plan view of the machine showing the complete path of the work carrier.

In Fig. 6, the closed circuit track loop, represented by the line 22, also indicates the path of the tongs. By arranging the track in the general shape of a flattened O, as shown, a plurality of successive stages of processing apparatus such as A, B, B', C, D, D', I and U, for applying etching, neutralizing and washing sprays and then streams of drying air or other media to an aluminum work sheet, may be located in a straight portion of the path at one side of the loop, as shown in Fig. 6, while the loading and unloading station 67 may be located in a straight portion of the path on the other side of the loop. By feeding the work piece transversely to its thickness dimension, the maximum surface area of the work is effectively exposed to the sprays, streams or other processing agencies. More complete details of the chemical, washing and drying treatment of an aluminum work sheet are described and specifically claimed in co-pending application Ser. No. 560,490 filed October 26, 1944 but detailed illustration and description thereof are not considered necessary for an understanding of the present invention.

By connecting the chain 27 with points on carriages 30 relatively near the track 22, the chain is guided to follow closely the path of the track, since the carriages are relatively close together as compared with the diameter of the curved ends of the track loop 22, Fig. 6.

When a sheet 71 of work material is being conveyed around the curve 70, Fig. 6, the work sheet tends to remain flat, as represented by the dot-dash line 71, intersecting the track line 22 at points 72, 73 and forming a chord across the curved path 70. It will be seen that both the ends and the middle of the work sheet on line 71 are considerably displaced laterally of track 22. The swivels 38 make it possible for the work piece 71 to remain flat and avoid distortion or marring where engaged by the tongs while the work changes its position laterally of the track as the track curvature changes from zero to an appreciable value and vice versa. As the result of the work sheet assuming position 71, the spacing between two pairs of carriages which may be assumed to be located approximately at the positions 72, 73, respectively, as measured along the straight line between them, is less than the original spacing of these pairs of carriages on a straight part of the track and is, therefore, less than the spacing between the two tongs supporting the sheet. By providing the vertical links, 29, Fig. 5, with their hinges 28, 99, this difference of spacings is compensated by the pairs of carriages moving closer together, as measured on a straight line between them, than they were on a straight portion of the track. The spacing between the tongs support units 37 remains unchanged as though they remained stationary in Fig. 5 while the links 29 at the left swing in a clockwise direction and the links at the right swing in a counter clockwise direction, so that the work sheet remains flat without being subjected to objectionable strain or tendency to bend, such as would occur without the hinged links 29. Since the passage of the work sheet along any change in curvature of the track should produce a rotation of the tongs support 37 relatively to the link 36 to avoid bending or marring of the work, it is necessary that each support 37 turn freely on its vertical swivel axis, and that the shoe 62 be clear of any guide rail, such as rails 63, 64, Fig. 16, while the work is traveling around curved portions of the path. It is necessary therefore, to provide the rails 63, 64 only at the loading and unloading station 67.

*Tongs Unloader*

Figure 2:
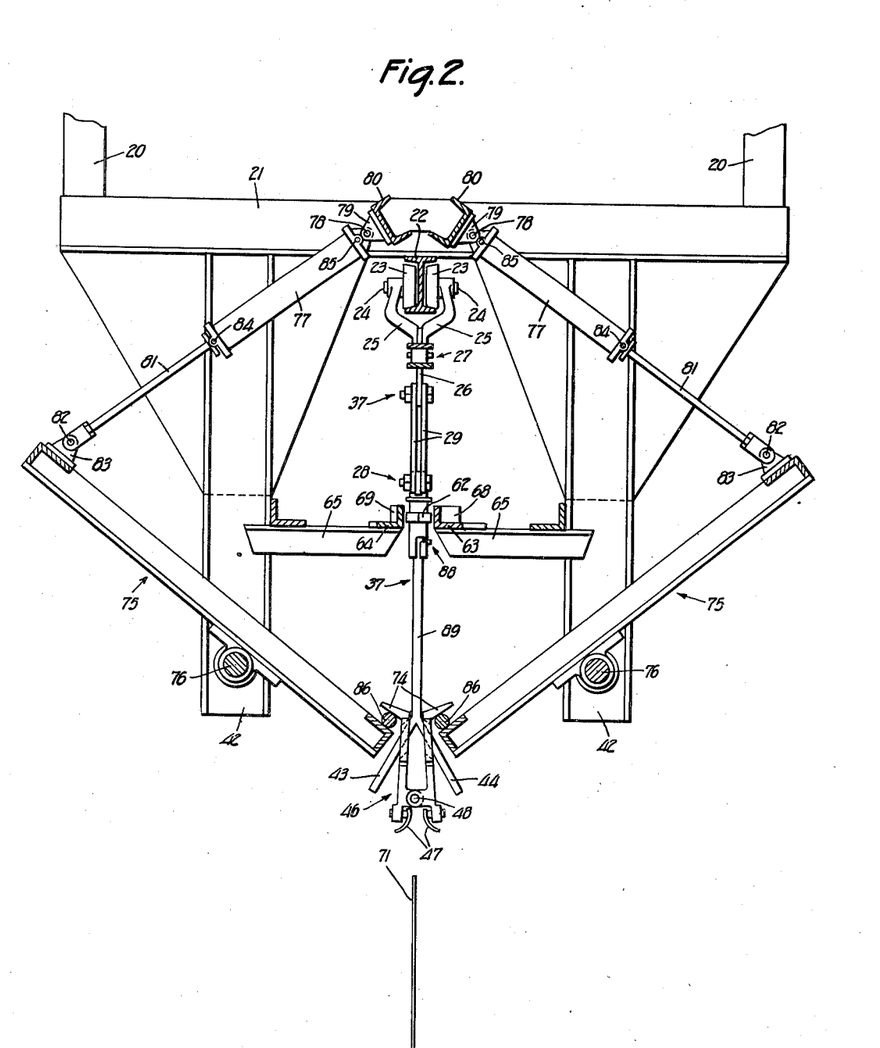
Fig. 2 is a sectional elevation similar to Fig. 1, but showing the tongs in unloading position.

Figs 1, 2 and 3 show apparatus at the unloading section of station 67, Fig. 6 for automatically unloading a sheet of aluminum or other piece of work material 71 from the tongs 46. The tong arms 49 have projections 74 extending outwardly in opposite directions from the upper ends of the arms. At each side of the tongs 46 as they carry a work piece into the unloading station, there is provided a rectangular frame 75, hinged on the stationary shaft 76, on a horizontal axis parallel with track 22 and the path of the tongs, the ends of shaft 76 being held by the columns 42. The frames 75 are normally maintained in the position shown in Fig. 1 where they are ineffective to unload the tongs, the frames being held in this inoperative position by double-acting fluid operated means including the piston cylinder 77 hinged on the pivot 78 on the fixed bracket 79, secured to the channel beam 80, which in turn is supported at its ends by girders 21 carried by the columns 20. The piston, not shown, within the cylinder, has a rod 81 extending through the lower end of the cylinder and hinged by the pivot 82 to the bracket 83 secured to the upper end frame 75.

Air or other fluid pressure applied to the opening 84 at the lower end of cylinder 77 forces the piston to its uppermost position, holding the frame 75 in its most nearly vertical position, as shown in Fig. 1. To unload the work sheet 71 from the tongs 46, air or other fluid pressure is applied through the opening 85 at the upper end of cylinder 77, thereby forcing the piston rod 81 downwardly to swing the upper end of frame 75 outwardly from track 22, and swinging the lower end of the frame toward the tongs 46, as shown in Fig. 2. It will be understood that the frames 75 may have any desired length as indicated by the breaks in the horizontal lines in Fig. 3, and that one or more additional fluid operated means, similar to that shown by cylinder 77, piston rod 81, etc., may be distributed along the length of each frame 75, to provide for more effective control of the tongs and to avoid undesirable distortion of the frame during operation, when the frame is of considerable length. It will further be understood that instead of a single frame 75 at each side of the path of the tongs 46, two or more may be used and placed end to end in alignment. Each frame may be actuated by a single cylinder 77, all of the cylinders being connected to a single control. The rod 86, fast to the lower edge of each frame 75 and parallel to the track 22 and the path of the tongs, is thus moved into the path of projections 74 and serves as a lifting bar to lift and trip the tongs by lifting the cam follower 50, Fig. 10, above the cam 51 and the follower 52 above the cam 53, at the same time pressing the arms 49 toward each other and opening the jaws of the tongs to release the work sheet 71.

In case the tongs resist opening, the opening sets of cam elements 54, 55 and 56, 57 come into engagement, as the tongs are further lifted by the bar 86 at each side of the tongs, and the jaws 47, are forced apart to release the work 71. Air or other control fluid is then fed into opening 84 to restore frame 75 to its inactive position, thereby allowing tongs 46 to drop back so that cam elements 50, 51 and 52, 53 close the jaws 47, as in Fig. 10, where they are then ready to receive a new work sheet at the loading station shown to the left of the unloading station in Fig. 6. In order to provide streamlined guidance for the projections 74, as they travel into engagement with the lifting bars 86, while the tongs travel continuously through the station 67 and to provide streamlined release of the tongs from the bars 86 as the projections 74 travel beyond the unloading apparatus, the ends 87 of the bars 86 are flared away from the path of the projections 74, as shown in Fig. 3.

*Coupler for tongs support*

When a work piece is of greater length than twice the distance between adjacent tongs, one or more tongs supporting units may intervene between the tongs to be used to support the long piece of work, or one or more tongs supporting units may intervene between one of the supporting tongs and the adjacent end of the work. By providing a self-aligning coupler such as bayonet joint 88 in each tongs supporting unit 37, between the guide shoe 62 and the cam element end 89 of the unit 37, the end 89 together with the tongs 46 supported thereby may be removed from the shoe end of the unit. The tongs intervening between those to be used as a support for a work piece and intervening between such support tongs and the end of the work piece may thus be quickly detached so that no such tongs can interfere with the free travel of the work piece around the two curved ends of the loop path 22 in Fig. 6 where it will be seen that any such intervening tongs would tend to obstruct the lateral movement of a work piece in traveling from a straight section of the track 22 to a position such as that represented by line 71 in Fig. 6, or in traveling from the position indicated by line 71 to a straight portion of the track 22 where the work piece is substantially in line with the straight track.

When replacing tongs at the connection 88 it will be seen that the rails 63 and 64 may be employed to hold the guide shoe 62 from turning on its vertical axis, thus facilitating the re-establishment of the bayonet joint connection 88. It will be seen that the bayonet joint insures maintenance of the alignment of the opening of the tong jaws 47 in parallelism with the direction of the guide shoe 62 so that when loading the tongs the jaws are always in the proper alignment for receiving the work.

When unloaded tongs approach the station 67, they may in general be oriented at various angles different from that in which the jaws 47 are positioned to receive work parallel with the track. The guide shoe 62, with the cooperation of rails 63, 64 at the track entrance of station 67, then serve to bring all the tongs arriving at the station into proper alignment for loading.

While the machine and apparatus described herein is particularly adapted for processing sheet aluminum it will be seen that various other work materials and other shapes of work pieces may be effectively conveyed around a work circuit utilizing one or more of the features of the invention.

We have described what we believe to be the best embodiments of our invention. We do not wish, however, to be confined to the embodiments shown, but what we desire to cover by Letters Patent is set forth in the appended claims.

We claim:

1. In a machine for carrying relatively thin work pieces transversely to the thickness dimension along a track having straight and laterally curved portions therein, a plurality of carriages distributed in succession along the track, a flexible coupling connecting said carriages together, a link coupling together the two carriages of each successive pair, each of said links having a tongs supporting unit mounted thereon and freely swiveled relatively thereto on a vertical axis, work gripping tongs supported by each of said swiveled units, and means between said flexible coupling and said link for permitting said link to swing parallel to the dierction of travel of said carriages.

2. In a machine according to claim 1, the combination in which said link is hinged at one end to one of the carriages of said pair and at the other end to the other of the carriages of said pair, a hinge being provided in each of said two carriages between said link and said flexible coupling.

3. In a machine, according to claim 1, the combination in which each of said tongs supporting unit has means including a guide shoe fast thereto for turning said unit on its vertical axis, means being positioned in the path of said shoe for engaging and turning the shoe into predetermined relation with the track in response to the movement of said carriages along the track.

4. In a machine according to claim 1, the combination in which each of said tongs supporting units has means, including a guide shoe fast thereto, for turning said unit on its vertical axis, means being positioned in the path of said shoes for directing the shoes into predetermined relation with the track in response to the movement of said carriages along the track, said shoe directing means including a rail positioned on opposite sides of the path of the shoes, one of said rails extending in advance of the other toward the approaching shoes, said advance rail having a guide edge at its advance end deflected away from the path of the shoes.

5. In a machine according to claim, 1, the combination in which each of said tongs supporting units has a guide shoe fast thereto, said unit including a self-aligning, quickly detachable joint between said shoe and the place where the tongs are supported by said unit.

6. In combination with tongs having work gripping jaws and arms for controlling said jaws, a pair of cams normally supporting said tongs and having cam surfaces normally pressing said arms in a direction urging said jaws together in response to the downward pull of said tongs on said cams, and means including a lifter at each side of said tongs, for raising said tongs relatively to said cams and for pressing said arms in a direction to open the jaws to permit the removal of work therefrom, and piston controlled means operating to raise said lifter into position to press said arms.

7. In combination with tongs having work gripping jaws and arms for controlling said jaws, a pair of cams normally supporting said tongs and having cam surfaces normally pressing said arms in a direction urging said jaws together in response to the downward pull of said tongs on said cams, and means including a lifter at each side of said tongs, for raising said tongs relatively to said cams and for pressing said arms in a direction to open the jaws to permit the removal of work therefrom, each of said tong arms being provided with a projection extending outwardly from the respective arm and above said lifter in a position to open said tong jaws in response to upward movement of said lifter.

8. The combination according to claim 6 in which said cams correspond in profile with the outside edges of the two legs of an inverted V.

9. In a tongs mechanism, a pair of hinged-together, horizontally openable, work-gripping tong jaws, a tong arm connecting with one of said jaws for controlling the movement and pressure of said jaw, a cam element on said arm, a tongs support having a cam element at one end for supporting the cam element on said arm, one of said elements being a cam having a substantially straight slope and the other of said elements being a follower, said cam elements having a characteristic applying a horizontal force to the jaw connected therewith in response to a vertical pressure between said cam elements, a projection extending outwardly from said arm, and piston controlled lifting means for applying a horizontal opening force to said jaws by pressing up against said projections.

10. In a tongs mechanism, a pair of hinged-together, horizontally openable, work-gripping tong jaws, a tong arm connecting with one of said jaws for controlling the movement and pressure of said jaw, a cam element on said arm, a tongs support having a cam element at one end for supporting the cam element on said arm, one of said elements being a cam having a substantially straight slope and the other of said elements being a follower, said cam elements having a characteristic applying a horizontal force to the jaw connected therewith in response to a vertical pressure between said cam elements said set of cam elements having a cam characteristic applying a closing force to said jaw in response to a downward pull of said arm on said support, a second set of cam elements for said jaws and including a cam element on a said arm and a cam element on said support, said second set of elements having a cam characteristic applying an opening force to said jaw in response to an upward push of said arm on said support.

11. The combination according to claim 6 in in which said piston operated means include piston cylinders, associated piston rods, and frames located below said lifters such that the movement of the piston rods will raise said frames into contact with said lifters.

12. In a machine for carrying relatively thin work pieces transversely to the thickness dimension along a track having straight and laterally curved portions therein, a plurality of carriages distributed in succession along the track, horizontal links having their ends hinged to the two carriages of each successive pair and connecting said carriages together, a tong mechanism comprising a pair of hinged-together, horizontally openable work-gripping tong jaws, a tong arm connecting with one of said jaws for controlling the movement and pressure of said jaw, a cam element on said arm, a tongs support having a cam element at one end for supporting the cam element on said arm, one of said elements being a cam having a substantially straight slope and the other of said elements being a follower, said cam elements having a characteristic applying a horizontal force to the jaw connected therewith in response to a vertical pressure between said cam elements, the tong support in said tong mechanism being mounted on said link and including swivel means permitting of rotation of said cam element end of said support on a vertical axis relatively to said link.

ERICH R. ZADEMACH.
WILLIAM W. CLARKE.

REFERENCES CITED

The following references are of record in the file of this patent:

UNITED STATES PATENTS

| Number | Name | Date |
|---|---|---|
| 599,568 | Lewis | Feb. 22, 1898 |
| 1,026,162 | Heichert | May 14, 1912 |
| 1,206,816 | Cruikshank | Dec. 5, 1916 |
| 1,417,528 | Irish et al. | May 30, 1922 |
| 1,930,607 | Brown | Oct. 17, 1933 |
| 2,100,512 | Kotowski | Nov. 30, 1937 |
| 2,173,952 | Ranney | Sept. 26, 1939 |
| 2,213,014 | Owen | Aug. 27, 1940 |
| 2,344,155 | McBride et al. | Mar. 14, 1944 |
| 2,344,476 | Turnbull | Mar. 14, 1944 |
| 2,363,392 | Buquor | Nov. 21, 1944 |
| 2,367,766 | Foss | Jan. 23, 1945 |